UNITED STATES PATENT OFFICE.

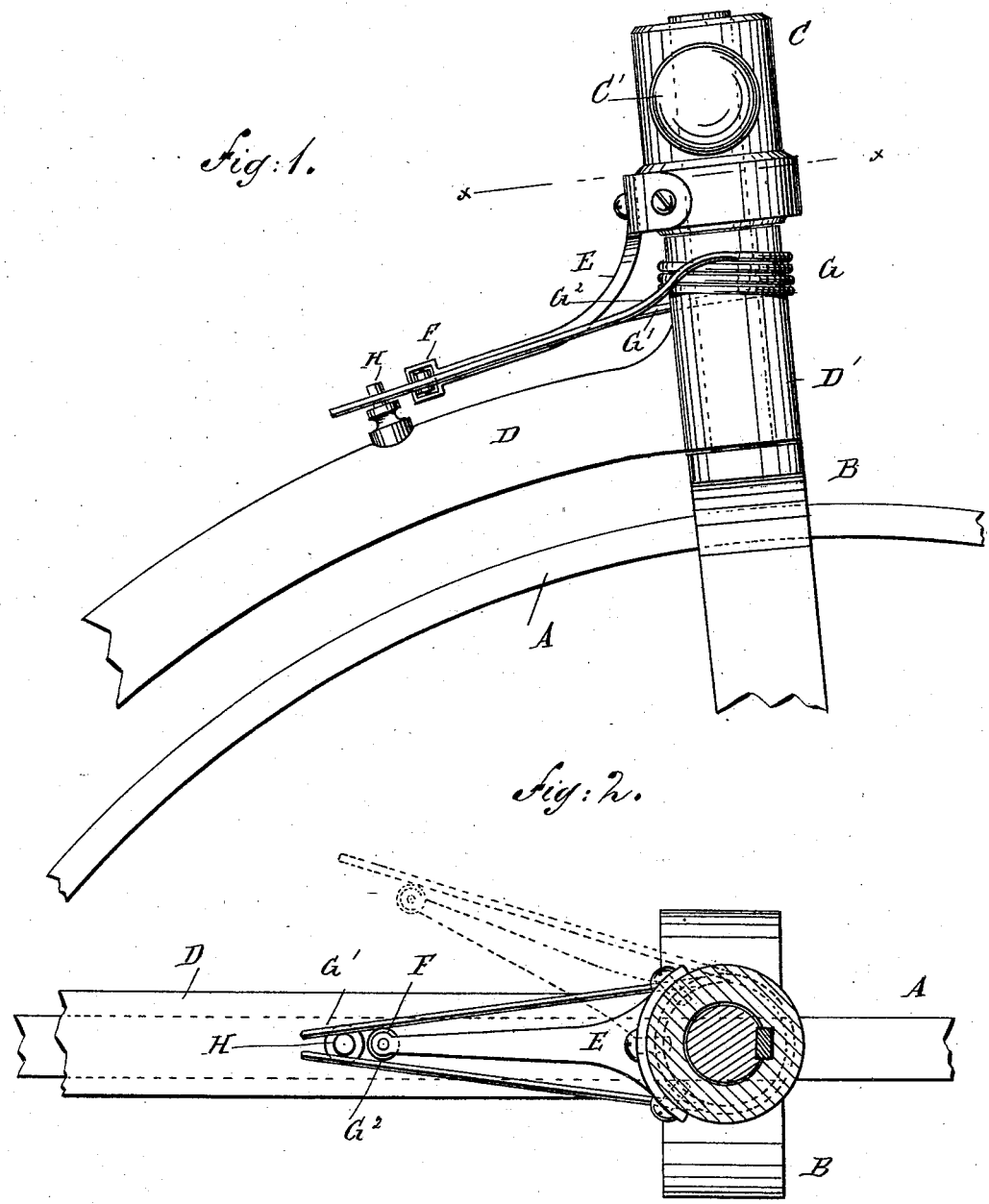

HIRAM F. HENRY, OF GOWANDA, NEW YORK.

BICYCLE.

SPECIFICATION forming part of Letters Patent No. 393,904, dated December 4, 1888.

Application filed July 11, 1888. Serial No. 279,607. (No model.)

*To all whom it may concern:*

Be it known that I, HIRAM F. HENRY, of Gowanda, in the county of Cattaraugus and State of New York, have invented a new and Improved Bicycle-Governor, of which the following is a full, clear, and exact description.

The object of the invention is to provide a new and improved bicycle-governor specially adapted to govern the steering-wheel by causing it to return automatically to its normal position when turned out of a straight line, and for holding it to its normal position when the rider has his hands off of the steering-arm.

The invention consists of an arm connected with the swinging part of the steering or turning standard, and of a spring held on the fixed frame, its ends pressing against the said arm.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a side elevation of the improvement as applied, and Fig. 2 is a sectional plan view of the same on the line $x$ $x$ of Fig. 1.

The steering-wheel A of a bicycle of any approved construction is mounted to turn in the frame B, carrying at its upper end the turning standard C, mounted to turn in the fixed frame D of the bicycle. The upper end of the turning standard is provided with the usual handles, C', which, when turned, cause a turning movement of the standard C and the frame B, whereby the wheel A, attached to the turning standard, is turned into or out of line with the fixed frame D.
On the turning standard C is secured an arm, E, extending outwardly and provided at its free end with a friction-wheel, F, adapted to engage the ends G' and G² of a spring, G, coiled on the bearing D' of the fixed frame D, as is plainly shown in Fig. 1. The ends G' and G² engage the friction-wheel F at opposite sides, and the extreme outer ends, G' and G², of the said spring G rest against a pin, H, secured on top of the fixed frame D.
Instead of employing the friction-wheel F, I may use a pin or lug projecting from the end of the arm E.

The operation is as follows: The ends G' and G² of the spring G, pressing against opposite sides of the friction-wheel F, hold the arm E in line with the fixed frame D, so that the turning standard C, which carries the said arm E, is also held in its normal position, so that the wheel A is in line with the frame D and with the usual remaining wheel of the bicycle. Now, when the operator turns the handles C' of the turning standard C, the wheel A is turned out of line with the fixed frame D by being mounted in the frame D, carrying the said turning standard C. At the same time the arm E is turned out of line with the frame D and turns in line with the wheel A. The friction-wheel F presses at this swinging motion of the arm E against one of the ends G' or G² of the spring G, so that the respective end G' is pressed outward away from the pin H, while the other end is held firmly in contact with the said pin H. The moment the operator releases his pressure on the handles C' the outwardly-pressed end G' or G² of the spring G, acting against the friction-wheel F, causes the arm E to swing inward, thereby turning the turning standard C and moving the frame B with the wheel A into the normal position. When the operator has his hands off of the handles C', the ends G' and G², pressing equally on both sides of the friction-wheel F, retain the arm E, the turning standard C, the frame B, and the wheel A in the normal position. Thus the governor, which is specially adapted for safety pattern bicycles, compels the turned wheel of the bicycle to re-return to a straight line when it is turned out of the straight line. The safety-bicycles are very sensitive and hard to govern, the tendency of the front wheel being always to turn to either side, and hence, while the said bicycles are the safest to ride, they are the most ungovernable.

The device above described overcomes the tendency of the wheel to turn, and upon its slightest inclination to do so immediately returns it automatically to its normal position. It is further manifest that should a bicycle be so constructed that the front wheel did not turn, but that a standard in front turned and communicated with the rear wheel, thus turning the rear wheel with the front standards, then this device could be attached either to the turning standard in front or the turning wheel in the rear.

Having thus described my invention, what I claim as new, and desire to secure by Letters Patent, is—

1. A bicycle-governor comprising a spring held on the fixed frame of the bicycle and provided with rearwardly-projecting ends, and an arm secured to the turning device of the guiding-wheel and projecting rearwardly between the ends of the said spring, substantially as described.

2. The combination, with a bicycle, of a pin secured to the fixed frame, a spring secured to the bearing of the said fixed frame and provided with rearwardly-projecting ends resting against the said pin, and an arm secured to the turning standard and projecting rearwardly between the ends of the spring, substantially as described.

3. The combination, with a bicycle, of the pin H, secured on the top of the fixed frame, the spring G, coiled on the bearing of the said fixed frame and provided with the rearwardly-projecting ends $G'$ $G^2$, resting against opposite sides of the said pin, the arm E, secured to the turning standard and projecting between the ends of the said spring, and the friction-wheel in the free end of the said arm, substantially as herein shown and described.

HIRAM F. HENRY.

Witnesses:
I. R. LEONARD,
W. R. SMALLWOOD.